United States Patent
Akiyoshi (10) Patent No.: US 8,775,785 B2
(45) Date of Patent: Jul. 8, 2014

(54) PROGRAM MANAGEMENT METHOD FOR PERFORMING START-UP PROCESS FOR PROGRAMS DURING START-UP OF DEVICE BASED ON THE PREVIOUS START-UP STATUS TO PREVENT OCCURRENCE OF AN OUT OF MEMORY CONDITION

(75) Inventor: Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 222 days.

(21) Appl. No.: 13/361,237

(22) Filed: Jan. 30, 2012

(65) Prior Publication Data
US 2012/0210110 A1    Aug. 16, 2012

(30) Foreign Application Priority Data

Feb. 16, 2011  (JP) .................................. 2011-030623
Dec. 21, 2011  (JP) .................................. 2011-279508

(51) Int. Cl.
*G06F 9/00*    (2006.01)
*G06F 15/177*  (2006.01)

(52) U.S. Cl.
USPC ............................................................ 713/2

(58) Field of Classification Search
None
See application file for complete search history.

(56) References Cited

U.S. PATENT DOCUMENTS

| | | | |
|---|---|---|---|
| 6,675,295 B1 * | 1/2004 | Marcelais et al. | 713/2 |
| 2004/0109188 A1 | 6/2004 | Akiyoshi et al. | |
| 2008/0059960 A1 | 3/2008 | Akiyoshi | |
| 2009/0063837 A1 * | 3/2009 | Shayer et al. | 713/2 |
| 2009/0328045 A1 * | 12/2009 | Burckhardt et al. | 718/102 |
| 2012/0023435 A1 * | 1/2012 | Kneppers et al. | 715/780 |

FOREIGN PATENT DOCUMENTS

| | | |
|---|---|---|
| JP | 06-161768 | 6/1994 |
| JP | 2002-049492 | 2/2002 |
| JP | 2004-122773 | 4/2004 |
| JP | 2004-127280 | 4/2004 |
| JP | 2008-084304 | 4/2008 |

* cited by examiner

*Primary Examiner* — Thomas Lee
*Assistant Examiner* — Zhipeng Wang
(74) *Attorney, Agent, or Firm* — IPUSA, PLLC (57) ABSTRACT

A device includes a storage unit configured to store programs; a start-up status storing unit; and a start-up management unit configured to perform a start-up process for each of the programs during start-up of the device, and record information indicating status of the start-up process in the start-up status storing unit in association with identification information of each of the programs. If information indicating that the start-up process has not been previously completed is present in the start-up status storing unit, the start-up management unit limits the programs to be started.

9 Claims, 7 Drawing Sheets

| PRODUCT ID | START-UP STATUS |
|---|---|
| 0x0005 | 2 |
| 0x000f | 0 |
| 0x0001 | 0 |

| PRODUCT ID | START-UP STATUS |
|---|---|
| 0x0005 | 3 |
| 0x000f | 0 |
| 0x0001 | 0 |

FIG.8

PROGRAM MANAGEMENT METHOD FOR PERFORMING START-UP PROCESS FOR PROGRAMS DURING START-UP OF DEVICE BASED ON THE PREVIOUS START-UP STATUS TO PREVENT OCCURRENCE OF AN OUT OF MEMORY CONDITION

CROSS-REFERENCE TO RELATED APPLICATIONS

The present application is based upon and claims the benefit of priority of Japanese Patent Application No. 2011-030623 filed on Feb. 16, 2011 and Japanese Patent Application No. 2011-279508 filed on Dec. 21, 2011, the entire contents of which are incorporated herein by reference.

BACKGROUND OF THE INVENTION

1. Field of the Invention

An aspect of this disclosure relates to a device, a program management method, and a storage medium.

2. Description of the Related Art

Japanese Laid-Open Patent Publication No. 2008-084304, for example, discloses an image forming apparatus including a platform (hereafter called an application platform) for executing application programs. The disclosed image forming apparatus allows the user to install application programs suitable for the user environment as plug-ins to add functions. Hereafter, such application programs may be called "plug-in applications".

Unlike the case of a personal computer (PC), it is generally not desirable to request the user of an image forming apparatus to manually start a plug-in application each time when using a function. Therefore, functions of an image forming apparatus need to be available immediately after its start-up. For this reason, typically, plug-in applications are automatically started by the application platform during the start-up of the image forming apparatus (i.e., when the power is turned on).

Meanwhile, compared with a PC, the amount of memory of an image forming apparatus is generally kept small to reduce the costs. Also in an image forming apparatus, "swapping" is normally not performed to improve the performance of plug-in applications. Accordingly, compared with a PC, an image forming apparatus is more likely to run out of memory.

Assuming that plug-in applications are newly installed in a normally-operating image forming apparatus and the image forming apparatus is restarted, the image forming apparatus may run out of memory during the start-up process of the plug-in applications, and the start-up of the application platform itself may fail. If the application platform is not running on an image forming apparatus, it is not possible to use (or execute) plug-in applications. Also, since the function to uninstall plug-in applications is implemented by the application platform, it may not be possible to uninstall the plug-in applications. In such a case, it is difficult to solve the problem by restarting the image forming apparatus because the out of memory condition described above may occur repeatedly.

SUMMARY OF THE INVENTION

In an aspect of this disclosure, there is provided a device that includes a storage unit configured to store programs; a start-up status storing unit; and a start-up management unit configured to perform a start-up process for each of the programs during start-up of the device, and record information indicating status of the start-up process in the start-up status storing unit in association with identification information of each of the programs. If information indicating that the start-up process has not been previously completed is present in the start-up status storing unit, the start-up management unit limits the programs to be started.

DESCRIPTION OF THE PREFERRED EMBODIMENTS

Figure 1:
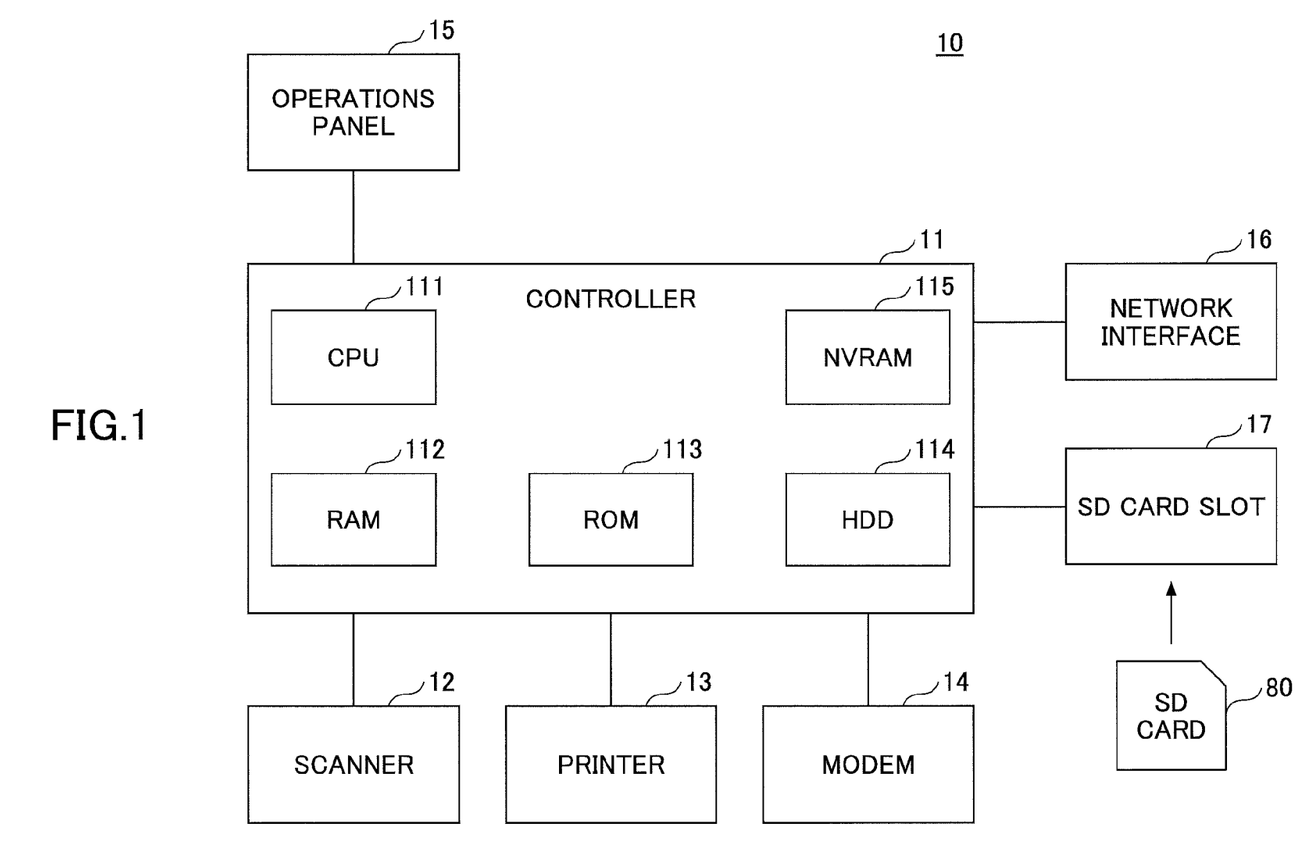
FIG. 1 is a block diagram illustrating an exemplary hardware configuration of an image forming apparatus.

Preferred embodiments of the present invention are described below with reference to the accompanying drawings. FIG. 1 is a block diagram illustrating an exemplary hardware configuration of an image forming apparatus 10 according to an embodiment. The image forming apparatus 10 is an example of a device according to an aspect of this disclosure. As illustrated in FIG. 1, the image forming apparatus 10 may include, as hardware components, a controller 11, a scanner 12, a printer 13, a modem 14, an operations panel 15, a network interface 16, and a secure digital (SD) card slot 17.

The controller 11 may include a central processing unit (CPU) 111, a random access memory (RAM) 112, a read-only memory (ROM) 113, a hard disk drive (HDD) 114, and a non-volatile RAM (NVRAM) 115. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs. The NVRAM 115 stores, for example, various settings.

The scanner 12 is a hardware component (image scanning unit) for scanning a document to obtain image data. The printer 13 is a hardware component (printing unit) for printing print data on a recording medium such as paper. The modem 14 is a hardware component for connecting the image forming apparatus 10 to a telephone line and is used to send and receive image data for facsimile communications. The operations panel 15 is a hardware component including an input unit such as buttons for receiving user inputs and a display unit such as a liquid crystal display panel. The network interface 16 is a hardware component for connecting the image forming apparatus 10 to a (wired or wireless) network such as a local area network (LAN). The SD card slot 17 reads, for example, programs stored in a secure digital (SD) card 80. With the image forming apparatus 10 configured as described above, in addition to the programs stored in the ROM 113 and the HDD 114, programs stored in the SD card 80 can be loaded into the RAM 112 and executed. Instead of the SD card 80, any other storage medium (e.g., a CD-ROM or a universal serial bus (USB) memory) may also be used for this purpose. That is, a storage medium that can be mounted on the image forming apparatus 10 is not limited to the SD card 80. When a storage medium other than the SD card 80 is used, the SD card slot 17 may be replaced with a hardware component corresponding to the storage medium used.

Figure 2:
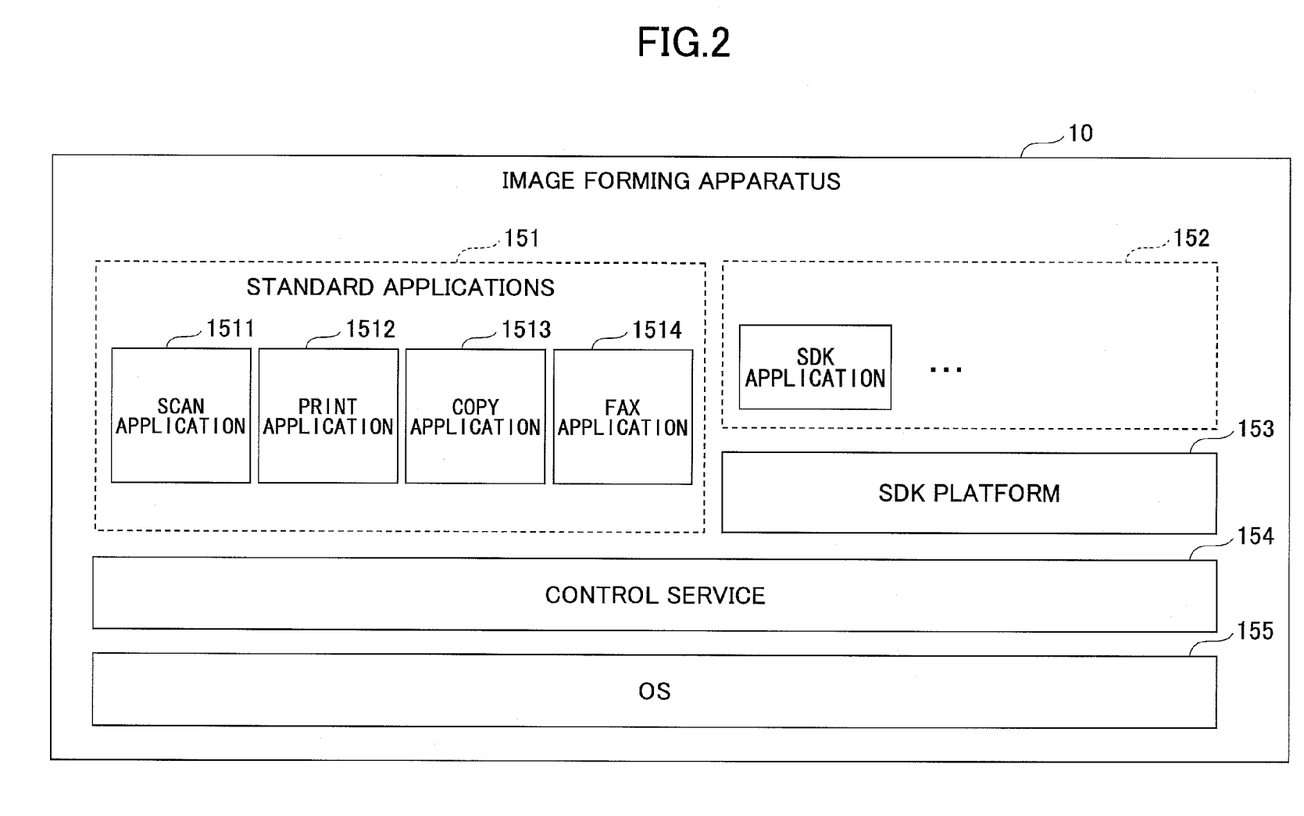
FIG. 2 is a drawing illustrating an exemplary software configuration of an image forming apparatus.

FIG. 2 is a drawing illustrating an exemplary software configuration of the image forming apparatus 10. As illustrated in FIG. 2, the image forming apparatus 10 may include standard applications 151, SDK applications 152, an SDK platform 153, a control service 154, and an OS 155.

The standard applications 151 are default applications installed in the image forming apparatus 10 before the factory shipment. In the example of FIG. 2, the standard applications 151 include a scan application 1511, a print application 1512, a copy application 1513, and a fax application 1514. The scan application 1511 performs a scan job. The print application 1512 performs a print job. The copy application 1513 performs a copy job. The fax application 1514 performs a facsimile transmission job and a facsimile reception job.

The control service 154 is implemented by software modules that, for example, provide functions for controlling various hardware resources to upper-layer applications and perform fundamental functions of the image forming apparatus 10.

The SDK applications 152 (may be called in the singular form for descriptive purposes) are plug-in applications that are additionally installed to add functions to the image forming apparatus 10 after its factory shipment. Applications implementing any appropriate functions may be provided as the SDK applications 152. For example, the SDK applications 152 may be installed via the SD card 80 or a network into the image forming apparatus 10. Each of the SDK applications 152 may run as a thread on the SDK platform 153.

The SDK platform 153 provides an execution environment for the SDK applications 152. The SDK applications 152 are developed using application programming interfaces (API) provided by the SDK platform 153. For example, the SDK platform 153 provides the SDK applications 152 with a scan function interface, a print function interface, and a copy function interface. APIs provided by the SDK platform 153 may be made public to allow a third party to develop the SDK applications 152. Since the APIs are machine-independent, it is generally not necessary to modify the SDK applications 152 for different types (or models) of image forming apparatuses. Here, the SDK platform 153 itself is also a type of an application program installed in the image forming apparatus 10. The SDK platform 153 may be installed, for example, via the SD card 80 or a network into the image forming apparatus 10. Unlike the SDK applications 152, however, the SDK platform 153 runs as a process on the OS 155.

The OS 155 is an operating system. Software programs in the image forming apparatus 10 run as processes or threads on the OS 155.

Figure 3:
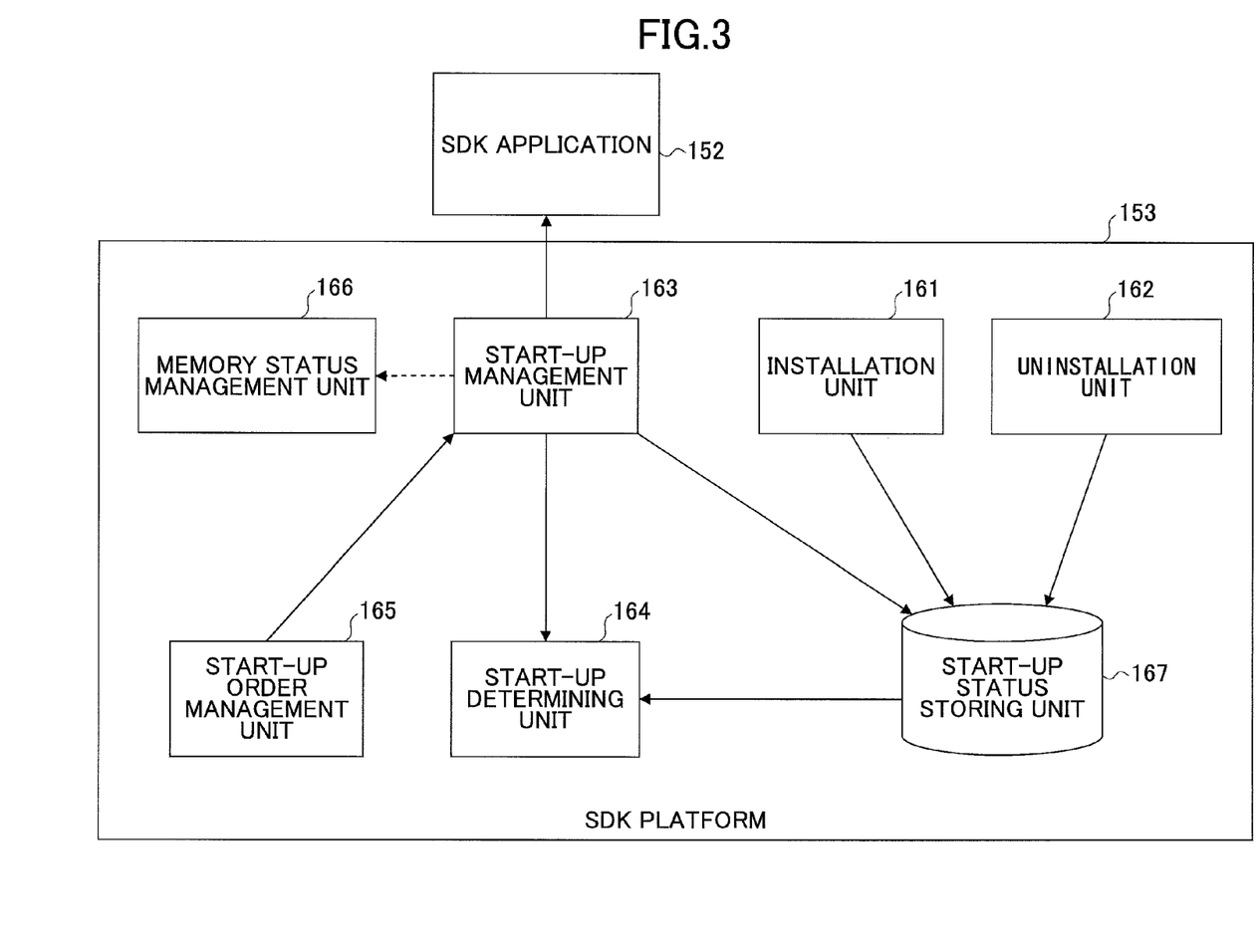
FIG. 3 is a block diagram illustrating an exemplary functional configuration of an SDK platform.

FIG. 3 is a block diagram illustrating an exemplary functional configuration of the SDK platform 153. As illustrated in FIG. 3, the SDK platform 153 may include an installation unit 161, an uninstallation unit 162, a start-up management unit 163, a start-up determining unit 164, a start-up order management unit 165, a memory status management unit 166, and a start-up status storing unit 167.

The installation unit 161 installs (or adds) the SDK applications 152. Also, the installation unit 161 generates, in the start-up status storing unit 167, records (hereafter called start-up status records) including identifiers (e.g., product IDs) of SDK applications 152 that are successfully installed and also set to an automatic-start mode. The start-up status records are used to manage start-up status of the SDK applications 152. The installation unit 161 sets "0", which is the initial value indicating the start-up status, in each of the generated start-up status records.

The start-up status is an example of information indicating the status (or progress) of a start-up process of the SDK application 152. In this embodiment, the start-up status may take one of the following values depending on the status of the start-up process:

0: immediately after installation
1: being started for the first time
2: start-up completed
3: being started for the second time or later Meanings of the respective values are described in more detail later.

Here, "automatic-start mode" indicates that the SDK application 152 is automatically started by the start-up management unit 163 during the start-up of the image forming apparatus 10. When an SDK application 152 is installed, the SDK application 152 is set to either the automatic-start mode or a manual-start mode. In the manual-start mode, the SDK application 152 is started in response to a start request input by the user at a random timing via, for example, the operations panel 15. Normally, the SDK applications 152 are set to the automatic-start mode. In the descriptions below, it is assumed that all installed SDK applications 152 are set to the automatic-start mode.

The start-up status storing unit 167 may be implemented, for example, by a storage area of the NVRAM 115 or the HDD 114, and stores start-up status records of the SDK applications 152 installed in the image forming apparatus 10.

The uninstallation unit 162 uninstalls (or removes) the SDK applications 152. Also, the uninstallation unit 162 removes the start-up status records including the product IDs of the uninstalled SDK applications 152 from the start-up status storing unit 167.

The start-up management unit 163 performs a start-up process for each of the SDK applications 152 installed in the image forming apparatus 10 during the start-up of the image forming apparatus 10. As the start-up process proceeds, the start-up management unit 163 updates the start-up status record of the SDK application 152.

The start-up determining unit 164 refers to the start-up status storing unit 167 and thereby determines whether to allow start-up of each of the SDK applications 152 installed in the image forming apparatus 10.

The start-up order management unit 165 determines the order in which the SDK applications 152 are started in a given occasion.

The memory status management unit 166 records a value (hereafter called an out-of-memory flag) indicating occurrence of an out of memory condition during the start-up process of the SDK application 152 in, for example, the NVRAM 115 or the HDD 114.

Figure 4:
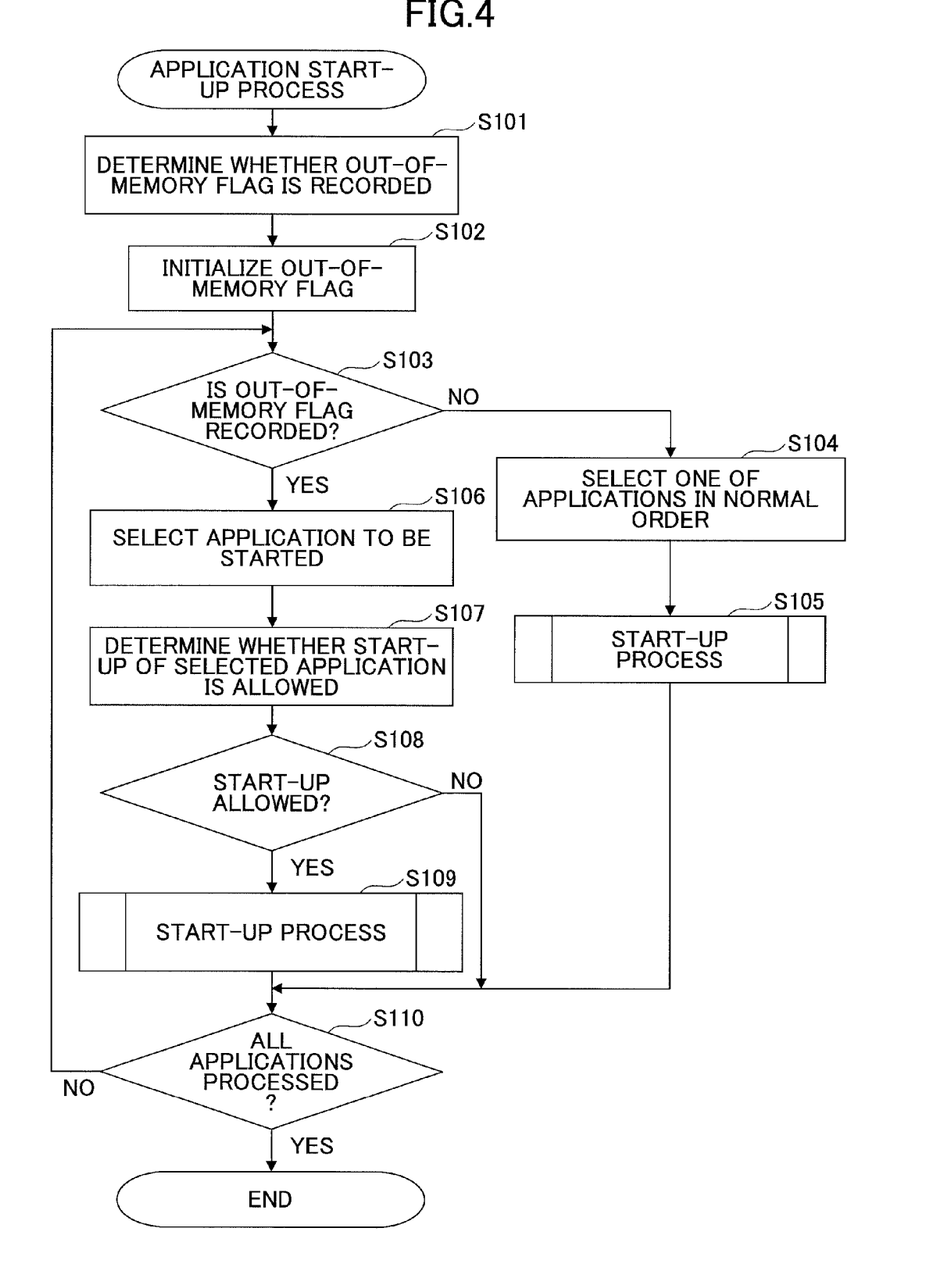
FIG. 4 is a flowchart illustrating an exemplary process performed during start-up of an image forming apparatus according to a first embodiment.

An exemplary process performed by the image forming apparatus 10 is described below. FIG. 4 is a flowchart illustrating an exemplary process performed during start-up of the image forming apparatus 10 according to a first embodiment.

When turned on, the image forming apparatus 10 starts an initialization process. In the initialization process (i.e., when the image forming apparatus 10 is turned on), the OS 155, the control service 154, the standard applications 151, and the SDK platform 153 are started in this order. During the start-up process of the SDK platform 153, the SDK platform 153 starts the SDK applications 152 installed in the image forming apparatus 10. FIG. 4 illustrates a process of starting the SDK applications 152 by the SDK platform 153.

In step S101, the start-up management unit 163 of the SDK platform 153 determines whether the out-of-memory flag is present. In other words, as is explained later, whether the out-of-memory flag was recorded in the previous start-up process of the image forming apparatus 10 is determined in step S101.

Next, the start-up management unit 163 initializes the out-of-memory flag (S102). For example, if the out-of-memory flag is present, the start-up management unit 163 removes the out-of-memory flag. This is to prevent the out-of-memory flag recorded in the previous start-up process ("previous" with respect to the current start-up process) of the image forming apparatus 10 from being used in the next start-up process of the image forming apparatus 10 (i.e., to prevent the use of the out-of-memory flag recorded two times before).

The start-up management unit 163 performs different steps depending on whether the out-of-memory flag is present, i.e., the process branches depending on whether the out-of-memory flag is present (S103). If the out-of-memory flag is not present (NO in S103), the start-up management unit 163 selects one of the SDK applications 152 in a normal order, for example, in ascending order of the product IDs (S104).

Then, the start-up management unit 163 performs a start-up process for the selected SDK application 152 (S105). Steps S104 and S105 are repeated for all the SDK applications 152 installed in the image forming apparatus (S110). Thus, in the example of FIG. 4, steps S104 and S105 are repeated for each of the SDK applications 152. In other words, multiple sets of steps S104 and S105 are performed sequentially. Alternatively, to reduce the time for processing the SDK applications 152, threads may be generated for respective sets of steps S104 and S105 (or start-up processes). In other words, multiple start-up processes (or multiple sets of steps S104 and S105) for the SDK applications 152 may be performed in parallel.

Details of the start-up process for the SDK application 152 in step S105 are described below.

Figure 5:
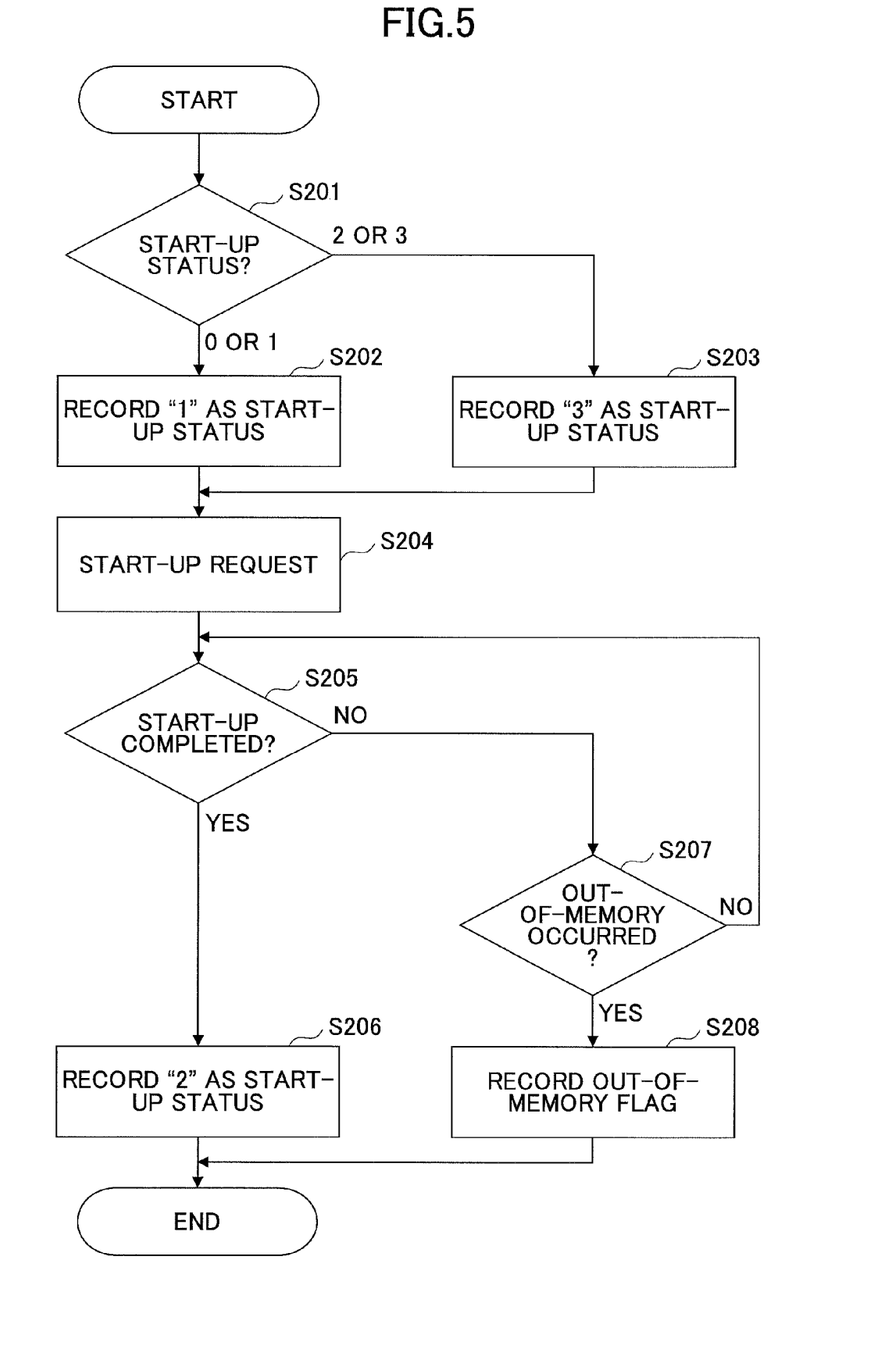
FIG. 5 is a flowchart illustrating an exemplary start-up process for an SDK application.

FIG. 5 is a flowchart illustrating an exemplary start-up process for the SDK application 152. In the descriptions below, an SDK application 152 for which the start-up process is performed is called a "target application".

In step S201, the start-up management unit 163 determines the current start-up status of the target application based on the corresponding start-up status record stored in the start-up status storing unit 167. The current start-up status here indicates the start-up status of the target application before being started. In other words, the current start-up status indicates the start-up status recorded during the previous start-up process of the image forming apparatus 10.

Figure 6:
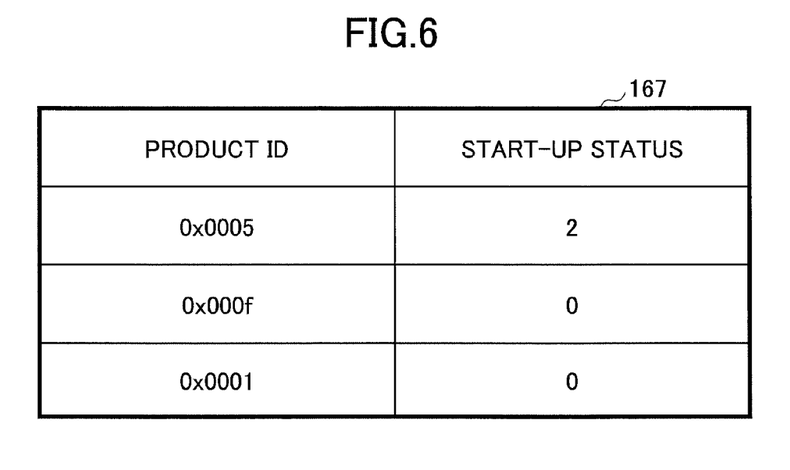
FIG. 6 is a table illustrating exemplary start-up status records stored in a start-up status storing unit.

FIG. 6 illustrates exemplary start-up status records stored in the start-up status storing unit 167. As illustrated in FIG. 6, the start-up status storing unit 167 stores start-up status records for the respective SDK applications 152 installed in the image forming apparatus 10. Each start-up status record includes the product ID and a value indicating the start-up status of the corresponding SDK application 152. In this example, "2" or "0" is recorded as the start-up status in the start-up status record of each of the SDK applications 152. The value "2" is recorded by the start-up management unit 163 when the start-up of the SDK application 152 is successfully completed. The value "0" is recorded by the installation unit 161 when the SDK application 152 is successfully installed. According to the start-up status records in FIG. 6, the start-up status of the SDK applications 152 are as described below.

The SDK application 152 with a product ID "0x0005" was successfully started in the previous start-up process of the image forming apparatus 10. The SDK applications 152 with product IDs "0x000f" and "0x0001" were installed when the image forming apparatus 10 was started previously and have never been automatically started.

When the current start-up status of the target application is "0" or "1", the start-up management unit 163 records "1" in the start-up status record as the start-up status of the target application (i.e., updates the start-up status) (S202). That is, since the target application has never been started or successfully started, "1" indicating that the target application is being started for the first time is recorded as the start-up status. Thus, "0" and "1" are examples of information indicating that the target application has never been started.

When the current start-up status of the target application is "2" or "3", the start-up management unit 163 records "3" in the start-up status record as the start-up status of the target application (i.e., updates the start-up status) (S203). That is, since the target application has been started at least once, "3" indicating that the target application is being started for the second time or later is recorded as the start-up status.

Figure 7:
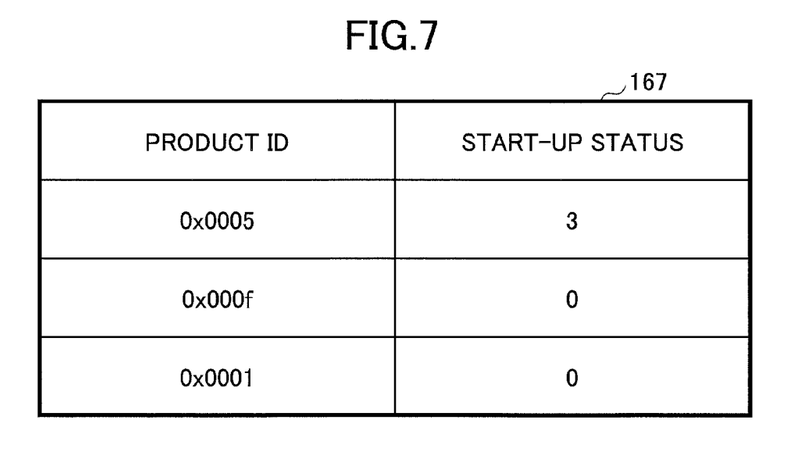
FIG. 7 is a table illustrating exemplary start-up status records during a start-up process.

FIG. 7 illustrates exemplary start-up status records during a start-up process. In FIG. 7, it is assumed that the SDK application 152 with the product ID "0x0005" is the target application. Since the current start-up status of the target application is "2" as illustrated in FIG. 6, the start-up status of the target application is updated to "3" in step S203.

Next, the start-up management unit 163 inputs a start-up request to the target application (S204). In response to the start-up request, the target application performs an initialization process for itself. In the initialization process, for example, the target application reserves (or secures) a memory area (heap area) as necessary. When the start-up of the target application is completed (YES in S205), the start-up management unit 163 records "2" in the start-up status record as the start-up status of the target application (i.e., updates the start-up status) (S206). That is, the start-up management unit 163 records normal or successful completion of the start-up process for the target application.

For example, the start-up management unit 163 detects completion of the start-up process of the target application based on a response to the start-up request. For example, when the target application is configured to receive the start-up request by calling a synchronous function or method, the response to the start-up request may correspond to a return from the called function or method. Meanwhile, when the target application is configured to receive the start-up request via an asynchronous function or method, the response to the start-up request may correspond to a start-up completion report sent by the target application when the start-up process is completed and the target application becomes a steady (normal or standby) state.

Meanwhile, if an out of memory condition (or an exception) occurs (YES in S207) after the start-up request is input and before the start-up process is completed (i.e., while the target application is being started), the memory status management unit 166 records the out-of-memory flag in, for example, the NVRAM 115 or the HDD 114 (S208).

In this case, the target application is not started, and the process of FIG. 4 is terminated. Accordingly, in this case, SDK applications 152 other than those already started will not be started. In certain circumstances, the process of the SDK platform 153 is also terminated and as a result, the SDK applications 152 running as threads on the SDK platform 153 are terminated. Thus, when an out of memory condition occurs, the user cannot use some or all of the SDK applications 152. Here, when an out of memory condition occurs, the start-up status of the target application stored in the start-up status storing unit 167 is "1" or "3". In the next start-up process of the image forming apparatus 10 (i.e., before the start-up process for the SDK application 152 is performed next time), the start-up status "1" or "3" indicates that the start-up process has not been previously completed. Thus, the start-up status "1" or "3" is an example of information indicating that the start-up process has not been previously completed.

When the image forming apparatus 10 is restarted after an out of memory condition occurs, the presence of the out-of-memory flag is determined in step S101 of FIG. 4.

The out-of-memory flag is recorded by the memory status management unit 166 to distinguish the termination of the process of FIG. 4 or 5 due to the occurrence of an out of memory condition from the termination of the process of FIG. 4 or 5 due to a forced power shutdown (e.g., blackout). That is, although it is possible to determine whether there is an SDK application 152 whose start-up process failed during the previous start-up process of the image forming apparatus 10 by referring to the start-up status storing unit 167, it is not possible to determine whether the failure is due to an out of memory condition or a forced power shutdown based only on the start-up status records in the start-up status storing unit 167.

There is even a case where the memory status management unit 166 cannot record the out-of-memory flag when an out of memory condition occurs. If this is likely to happen, the image forming apparatus 10 may be configured to not use the out-of-memory flag. In this case, the start-up management unit 163 may be configured to determine whether there is a "failed" SDK application 152 (with the start-up status "1" or "3") whose start-up process failed in the previous start-up process of the image forming apparatus 10 by referring to the start-up status storing unit 167. Steps S104 and S105 may be performed if there is no failed SDK application 152, and steps S106 through S109 may be performed when there is a failed SDK application 152.

Referring back to FIG. 4, if the out-of-memory flag is present (YES in S103), the start-up order management unit 165 selects one of the SDK applications 152 to be started (S106). For example, the start-up order management unit 165 may be configured to select SDK applications 152 in descending order of memory (heap) consumption. Take, for example, an SDK application 152 that temporarily consumes a large amount of memory during start-up and consumes a smaller amount of memory after start-up (i.e., the peak of the memory consumption is at the start-up). If a start-up process for this SDK application 152 is performed after many other SDK applications 152 are started, i.e., when the amount of remaining memory is small, an out of memory condition may occur. Therefore, the start-up order management unit 165 may be configured to start an SDK application 152 that temporarily consumes a large amount of memory during start-up when the amount of remaining memory is still large. This configuration makes it possible to prevent the occurrence of an out of memory condition and to increase the chance of being able to start all SDK applications 152. The memory consumption at start-up of an SDK application 152 may be reported by the developer of the SDK application 152, and the reported memory consumption may be recorded as attribute information of the SDK application 152 in, for example, the NVRAM 115 or the HDD 114 when the SDK application 152 is installed. Alternatively, the installation unit 161 may be configured to (virtually) start the SDK application 152 during an installation process as a test to measure the memory consumption and to record the measured memory consumption in the NVRAM 115 or the HDD 114.

Also, the start-up order management unit 165 may be configured to select the SDK applications 152 when the out-of-memory flag is present in descending order of priority that is recorded, for example, in the NVRAM 115 or the HDD 114.

Also, the start-up order management unit 165 may be configured to select the SDK applications 152 in the order of installation. In this case, an SDK application 152 that has been installed most recently is selected last. This configuration, in combination with the start-up determining unit 164 described later, makes it possible to increase the number of SDK applications 152 that can be installed.

The order of installation may be determined, for example, based on the order of start-up status records in the start-up status storing unit 167. Alternatively, information indicating the order of installation may be recorded by the installation unit 161 when installing the SDK applications 152, and the start-up order management unit 165 may be configured to select the SDK applications 152 based on the information.

Further, even if the out-of-memory flag is present (YES in S103), the SDK applications 152 may be selected in the normal order.

Referring back to FIG. 4, the start-up determining unit 164 determines whether to allow start-up of the SDK application 152 (hereafter called a target application) selected by the start-up order management unit 165 by referring to the start-up status storing unit 167 (S107). For example, the start-up determining unit 164 allows start-up of SDK applications 152 other than an SDK application 152 whose start-up process failed during the previous start-up process of the image forming apparatus 10. More specifically, the start-up determining unit 164 does not allow start-up of the target application if the start-up status is "1" or "3". Otherwise, the start-up determining unit 164 allows start-up of the target application. Since the start-up status "1" or "3" indicates that an out of memory condition occurred during the previous start-up process of the SDK application 152, starting the SDK application 152 may cause an out of memory condition again.

Alternatively, the start-up determining unit 164 may be configured to allow start-up of SDK applications 152 other than an SDK application(s) 152 installed most recently. For example, the start-up determining unit 164 does not allow start-up of the target application if the start-up status is "0" or "1" and allows start-up of the target application if the start-up status is other than "0" and "1". This configuration makes it possible to reproduce a situation where all SDK applications 152 are successfully started. That is, this configuration makes it possible to prevent start-up of the most-recently installed SDK application 152 that has caused an out of memory condition.

If start-up of the target application is allowed by the start-up determining unit 164 (YES in S108), the start-up management unit 163 performs a start-up process for the target application (S109). The start-up process of step S109 is substantially the same as the start-up process of step S105 described with reference to FIG. 5.

In step S109, however, SDK applications 152 are preferably started in sequence. That is, instead of concurrently executing multiple start-up processes as threads, the start-up management unit 163 is preferably configured to wait for the completion of a start-up process for an SDK application 152 before performing a start-up process for the next SDK application 152. If start-up processes for SDK applications 152 that consume a large amount of memory at start-up are performed in parallel, the peaks of memory consumption may overlap and an out of memory condition may occur. Performing start-up processes in sequence (or in series) makes it possible to prevent this problem.

If start-up of the target application is not allowed by the start-up determining unit 164 (NO in S108), the start-up process for the target application is not performed.

Steps S106 through S109 are repeated for all the SDK applications 152 installed in the image forming apparatus 10 (S110). As described above, steps S106 through S109 are generally performed if an out of memory condition occurs in the previous start-up process of the image forming apparatus 10. In steps S106 through S109, the start-up determining unit 164 prevents start-up of one or more SDK applications 152 to prevent occurrence of an out of memory condition. This configuration makes it possible to reduce the chance that an out of memory condition occurs in succession. In other words, this configuration makes it possible to prevent failure of start-up processes of the SDK applications 152, and thereby makes it possible to improve the chance that the SDK platform 153 is normally started. If the SDK platform 153 is normally started, the user can uninstall unnecessary or low-priority SDK applications 152 via the uninstallation unit 162 to reduce the chance that an out of memory condition occurs in the subsequent start-up processes of the image forming apparatus 10.

The start-up management unit 163 may instead be configured to automatically start none of the SDK applications 152 if the out-of-memory flag is present (YES in S103). In this case, the start-up management unit 163 may be configured to display a message indicating the occurrence of an out of memory condition on, for example, the operations panel 15, and to request the user to select SDK applications 152 to be started.

Figure 8:
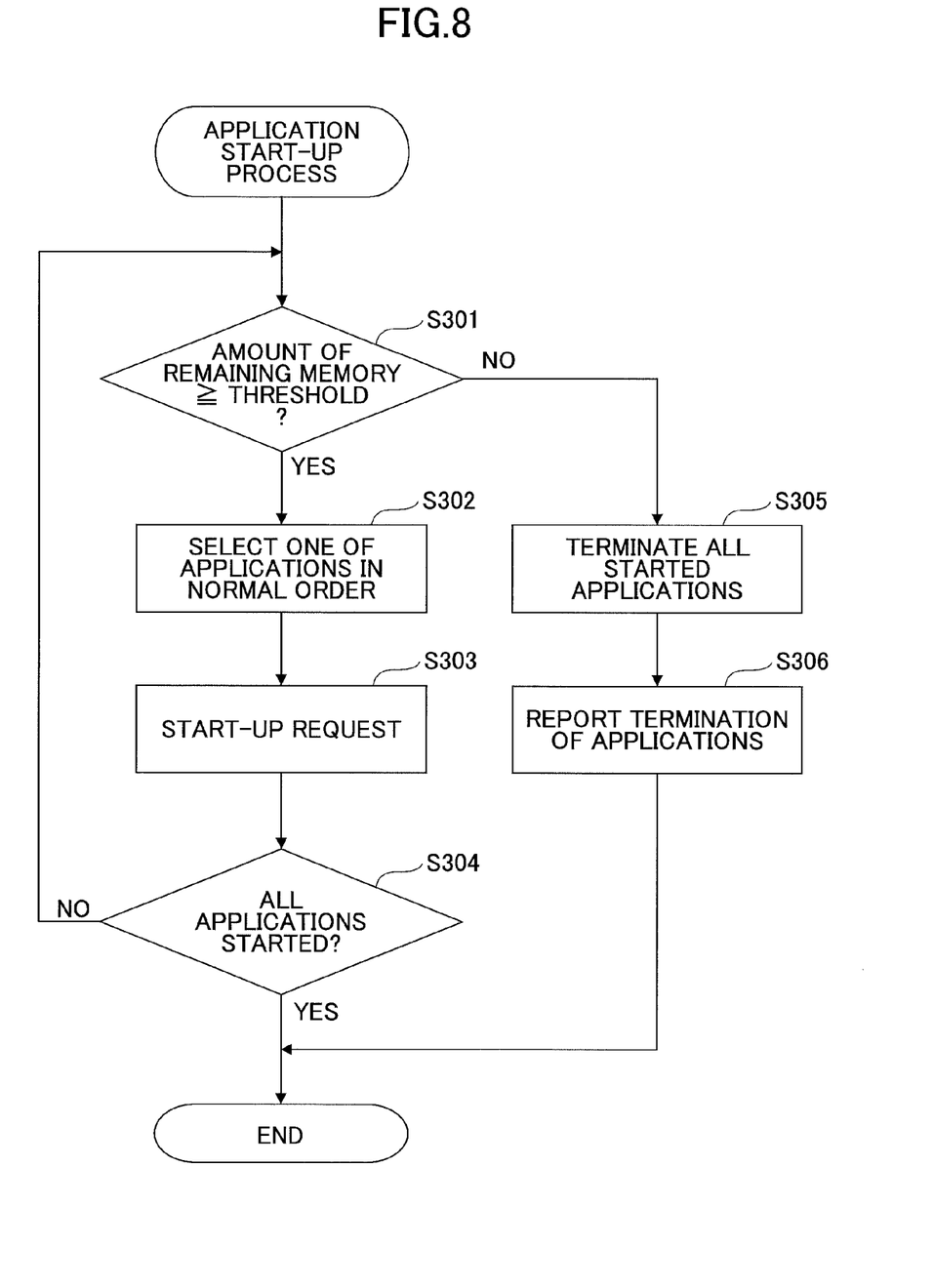
FIG. 8 is a flowchart illustrating an exemplary process performed during start-up of an image forming apparatus according to a second embodiment.

A second embodiment is described below. FIG. 8 is a flowchart illustrating an exemplary process performed during start-up of the image forming apparatus 10 according to a second embodiment. In FIG. 8, similarly to FIG. 4, it is assumed that an initialization process is performed by the image forming apparatus 10, and a process of starting the SDK applications 152 is performed during the start-up process of the SDK platform 153.

In step S301, the start-up management unit 163 of the SDK platform 153 determines whether the amount of remaining memory (or the amount of remaining heap area) is greater than or equal to a threshold. The threshold may be predetermined and stored in, for example, the NVRAM 115 or the HDD 114. Alternatively, assuming that the memory consumption at start-up is recorded as attribute information in the NVRAM 115 or the HDD 114 for each of the SDK applications 152, the threshold may be dynamically determined (e.g., in step S301) by the start-up management unit 163 by adding a value α to the largest memory consumption among the SDK applications 152 or to the memory consumption of an SDK application 152 to be started next. For example, the value a may indicate the amount of memory necessary to normally start the SDK platform 153. The memory consumption at start-up of an SDK application 152 may be reported by the developer of the SDK application 152, or may be measured by (virtually) starting the SDK application 152 during the installation process.

If the amount of remaining memory is greater than or equal to the threshold (YES in S301), the start-up management unit 163 selects one of the SDK applications 152 in a normal order, for example, in ascending order of the product IDs (S302). Next, the start-up management unit 163 inputs a start-up request to the selected SDK application 152 (S303).

When start-up requests are input to all the SDK applications 152 installed (YES in S304), all the SDK applications 152 become available and the start-up process of the image forming apparatus 10 is completed.

Meanwhile, if it is detected that the amount of remaining memory is less than the threshold (NO in step S301) at any point during the process of starting the SDK applications 152, the start-up management unit 163 terminates threads of all SDK applications 152 that have already been started (S305). As a result, the memory being occupied by the already-started SDK applications 152 is released, and the SDK platform 153 is normally started. Then, the start-up management unit 153 reports to the user that the SDK applications 152 have been terminated (S306). For example, the start-up management unit 153 displays, on the operations panel 15, a message indicating that the SDK applications 152 have not been started due to insufficient memory. The user reads the message and determines that the SDK applications 152 have not been started.

With the above configuration, the image forming apparatus 10 is started with the SDK platform 153 normally running. Therefore, the user can request the SDK platform 153 to uninstall unnecessary SDK applications 152 and to cancel the automatic-start mode of some SDK applications 152. This in turn makes it possible to prevent the image forming apparatus 10 from being started again with all the SDK applications 152 unavailable.

As a variation of the process of FIG. 8, step S305 may be omitted. In this case, already-started SDK applications 152 are not terminated. However, step 5305 is preferably performed to terminate already-started SDK applications 152 and thereby to increase the chance that the SDK platform 153 is normally started.

As another variation, when the amount of remaining memory is less than the threshold, a start-up process may be performed for an SDK application(s) 152 (which has not been started) whose memory consumption at start-up is less than the threshold. In other words, the start-up management unit 163 may be configured to not start SDK applications 152 whose memory consumption at start-up is greater than or equal to the threshold.

As described above, the second embodiment makes it possible to normally start the SDK platform 153 even when the amount of memory becomes insufficient without restarting the image forming apparatus 10.

In addition to the image forming apparatus 10, the above embodiments may also be applied to any apparatus such as a projector, a smartphone, a cell phone, or a digital camera where programs are installable.

An aspect of this disclosure provides a device, a program management method, and a non-transitory computer-readable storage medium storing program code that make is possible to prevent failure of start-up processes of programs.

The present invention is not limited to the specifically disclosed embodiments, and variations and modifications may be made without departing from the scope of the present invention.

What is claimed is:
1. A device, comprising:
a storage unit configured to store programs;
a start-up status storing unit; and
a start-up management unit configured to
   perform a start-up process for each of the programs
     during start-up of the device, and record information indicating status of the start-up process in the start-up status storing unit in association with identification information of each of the programs, wherein when information indicating that the start-up process has not been previously completed is present in the start-up status storing unit, the start-up management unit limits the programs to be started;

when a program has never been started after installation, the start-up status storing unit stores information indicating that the program has never been started after installation in association with the identification information of the program; and the start-up management unit is configured to perform the start-up process for each of the programs other than the program whose identification information is associated with the information indicating that the program has never been started after installation.

2. The device as claimed in claim 1, wherein the start-up management unit is configured to not perform the start-up process for a program that corresponds to the identification information associated, in the start-up status storing unit, with the information indicating that the start-up process has not been previously completed.

3. The device as claimed in claim 1, wherein the start-up management unit is configured to start the programs in descending order of memory consumption.

4. A method performed by a device that stores programs, the method comprising:

performing a start-up process for each of the programs during start-up of the device;

recording information indicating status of the start-up process in a start-up status storing unit of the device in association with identification information of each of the programs; and when information indicating that the start-up process has not been previously completed is present in the start-up status storing unit, limiting the programs to be started, wherein when a program has never been started after installation, information indicating that the program has never been started after installation is recorded in the start-up status storing unit in association with the identification information of the program; and the start-up process is performed for each of the programs other than the program whose identification information is associated with the information indicating that the program has never been started after installation.

5. The method as claimed in claim 4, wherein the start-up process is not performed for a program that corresponds to the identification information associated, in the start-up status storing unit, with the information indicating that the start-up process has not been previously completed.

6. The method as claimed in claim 4, wherein the programs are started in descending order of memory consumption.

7. A non-transitory computer-readable storage medium storing program code for causing a device that stores programs to perform a method, the method comprising:

performing a start-up process for each of the programs during start-up of the device;

recording information indicating status of the start-up process in a start-up status storing unit of the device in association with identification information of each of the programs; and when information indicating that the start-up process has not been previously completed is present in the start-up status storing unit, limiting the programs to be started, wherein when a program has never been started after installation, information indicating that the program has never been started after installation is recorded in the start-up status storing unit in association with the identification information of the program; and the start-up process is performed for each of the programs other than the program whose identification information is associated with the information indicating that the program has never been started after installation.

8. The storage medium as claimed in claim 7, wherein the start-up process is not performed for a program that corresponds to the identification information associated, in the start-up status storing unit, with the information indicating that the start-up process has not been previously completed.

9. The storage medium as claimed in claim 7, wherein the programs are started in descending order of memory consumption.

* * * * *